US012434492B2

(12) United States Patent
Van Vliembergen et al.

(10) Patent No.: US 12,434,492 B2
(45) Date of Patent: Oct. 7, 2025

(54) METHOD AND PRINTER FOR PRINTING ON PRINT MEDIA

(71) Applicant: Canon Production Printing Holding B.V., Venlo (NL)

(72) Inventors: Eduardus J. W. Van Vliembergen, Venlo (NL); Martinus G. M. Lange, Venlo (NL)

(73) Assignee: Canon Production Printing Holding B.V., Venlo (NL)

( * ) Notice: Subject to any disclaimer, the term of this patent is extended or adjusted under 35 U.S.C. 154(b) by 187 days.

(21) Appl. No.: 18/388,063

(22) Filed: Nov. 8, 2023

(65) Prior Publication Data

US 2024/0165973 A1 May 23, 2024

(30) Foreign Application Priority Data

Nov. 22, 2022 (EP) .................................... 22208801

(51) Int. Cl.
*B41J 11/00* (2006.01)
*B41J 11/24* (2006.01)

(52) U.S. Cl.
CPC ............ *B41J 11/007* (2013.01); *B41J 11/009* (2013.01); *B41J 11/24* (2013.01); *B41J 2203/01* (2020.08)

(58) Field of Classification Search
CPC ......... B41J 11/007; B41J 11/009; B41J 11/24; B41J 2203/01; B41J 11/0025; B41J 11/0035; B41J 11/008; B41J 11/0095; B41J 15/22
See application file for complete search history.

(56) References Cited

U.S. PATENT DOCUMENTS

| | | | |
|---|---|---|---|
| 6,350,009 | B1 | 2/2002 | Freund et al. |
| 2007/0208675 | A1 | 9/2007 | Desire et al. |
| 2009/0007811 | A1 | 1/2009 | Weingartner |

OTHER PUBLICATIONS

European Search Report of application No. 22 20 8801 dated Apr. 28, 2023.

*Primary Examiner* — Jannelle M Lebron
(74) *Attorney, Agent, or Firm* — Birch, Stewart, Kolasch & Birch, LLP

(57) ABSTRACT

A method for a printer including a transport device including an endless transport belt, supported on a pair of support rollers which between them define a medium support plane, over which medium support plane a print station is provided. The method includes transporting in parallel a plurality of individual print media perpendicular to a scanning direction of the print station on the medium support plane, the print media having different dimensions, determining positions of the individual print media and based on the determined positions, jetting marking material for forming a designated image specific for each print medium on each respective print medium. The above steps are repeated such that print media are printed in a plurality of parallel lanes on the medium support plane perpendicular to the scanning direction. The method further includes enabling or disabling each individual lane of the plurality of parallel lanes in order to respectively facilitate or block jetting of the marking material at the individual lane.

14 Claims, 10 Drawing Sheets

METHOD AND PRINTER FOR PRINTING ON PRINT MEDIA

BACKGROUND OF THE INVENTION

1. Field of the Invention

The present invention relates to a method for a printer comprising a transport device comprising an endless transport belt supported on a pair of support rollers, which between them define a medium support plane, over which medium support plane a print station is provided, wherein the method comprises the steps of transporting in parallel a plurality of individual print media perpendicular to a scanning direction of the print station on the medium support plane, the print media having different dimensions, determining positions of the individual print media, based on the determined positions, jetting marking material for forming a designated image specific for each print medium on each respective print medium, wherein the above steps are repeated such that print media are printed in a plurality of parallel lanes on the medium support plane perpendicular to the scanning direction.

The invention also relates to a printer—specifically a large format hybrid printer—, which comprises a print controller which is configured to execute the steps of the method according to the present invention.

The media support plane may also be called "table" hereinafter.

A rigid print medium may also be called "rigid", "board" or "rigid board".

The print medium may also be called "print media" or "print media piece".

The belt may also be mentioned as the media support plane.

2. Description of Background Art

Large format hybrid printers are configured to print both rigid substrates as well as flexible print media. Such a printer may comprise a transport device comprising an endless transport belt supported on at least one pair of support rollers, which between them define a medium support plane. Over the medium support plane a print station is provided. The print station generally comprises a printhead carriage translatable over the belt to print an image on a print medium on the belt in consecutive swaths. The print medium is moved in steps in between passes of the printhead carriage.

A large format hybrid printer is intended to be a productive engine capable of printing both on roll-2-roll media and on rigids. To be productive on rigids. The printer is equipped with a multilane concept. With this, multiple rigids can be printed in parallel next to each other. The multilane concept increases productivity since there will be less "turn time" for the print station compared to "jetting time".

In order to enhance an overall productivity and to reduce operator hassle the printer supports the feature of independent board feeding, i.e. the print medium does not need to be aligned in the transport direction.

However, the print station always must travel fully to an uttermost side of the medium support plane as there is a maintenance station or keep healthy station. A travel distance to the uttermost side of the medium support plane however depends on the location of the images that need to be printed.

SUMMARY OF THE INVENTION

It is an object of the invention to provide a printer with an improved productivity.

In accordance with the present invention, a method for printing according to claim 1 is provided.

By disabling lanes from an uttermost side of the medium support plane a required travel distance of the print station is reduced leading to a higher productivity of the printer. By disabling lanes it is already known beforehand that these lanes will not be used and because of the fact that an image size of print jobs to be printed is also known a print swath becomes smaller.

By disabling at least one lane, the smaller print swath is already known upfront and does not have to be changed anymore during printing, for example in the middle of printing an image which would lead to potential differences in print quality.

The operator may even decide to position a guiding bar at a position close to one of the uttermost sides of the medium support plane, for example at ⅓th from the one uttermost side of the medium support plane and using only the part of the printer at the other side of this bar which is not neighboring the one uttermost side. By doing so, a higher productivity is achieved, since the pass may be shortened until the guiding bar is reached by the print station. A guiding bar may also be called an alignment bar hereinafter.

According to an embodiment the method comprises the step of disabling at least one lane from one of the sides of the medium support plane parallel to the transport direction of the print media and, while printing on the print media, reducing a swath of the print station in the scanning direction so that the at least one disabled lane is not scanned by the print station.

According to an embodiment the printer comprises above each lane a signaling object, the step of enabling at least one lane comprises the sub-step of activating the signaling object above the at least one lane, and the step of disabling at least one lane comprises the sub-step of deactivating the signaling object above the at least one lane. The signaling object may be a LED light indication. According to an alternative embodiment the signaling object is provided at a surface of the medium support plane. The signaling object may be a LED or a color changing area in the medium support plane. According to another embodiment the step of disabling at least one lane comprises the sub-step of blocking the lane with a barrier object to be put in the medium support plane.

According to an embodiment the printer comprises alignment bars extending in the transport direction and positioned at a side of at least one lane, and the method comprises the steps of detecting a print medium being fed in a first lane which print medium is wider in the scanning direction than half a width between two adjacent alignment bars which enclose the first lane and a second lane, and blocking the second lane for feeding print media.

According to an embodiment the method comprises the steps of printing the at least one image of a print job in a first print mode, detecting a next print job comprising an image to be printed in a second print mode, and blocking all lanes for feeding print media until the printer has completed the printing of the at least one image of the print job in the first print mode.

According to an embodiment the method comprises the steps of printing the at least one image of a print job on a print media of a first thickness, detecting a next print job comprising an image to be printed on a print media of a another thickness than the first thickness, and blocking all lanes for feeding print media until the printer has completed the printing of the at least one image of the print job on the print media of the first thickness.

According to an embodiment the method comprises the steps of detecting a print job to be printed on a new print media having unknown media settings like type or size, and blocking all lanes for feeding the new print media until the new print media has been made known to the printer and the printer has completed the printing of the pending images of previous print jobs.

According to an embodiment the step of enabling or disabling each individual lane of the plurality of parallel lanes comprises the sub-step of receiving an indication for each lane that should be enabled or disabled by means of a user interface of the printer.

The present invention also relates to a printer comprising a transport device comprising an endless transport belt supported on a pair of support rollers which between them define a medium support plane, over which medium support plane a print station is provided, wherein the printer comprises a print controller which is configured to execute the steps of a method according to the present invention.

According to an embodiment the printer comprises above each lane a signaling object which is activated when the corresponding lane is enabled and which is deactivated when the corresponding lane is disabled.

According to an embodiment the printer comprises alignment bars extending in the transport direction and positioned at a side of at least one lane.

According to an embodiment the printer comprises at least one detector to detect a feeding of a print medium in the print medium plane.

According to an embodiment the printer is a hybrid printer for printing on rigid print media as well as on flexible print media. The flexible print media may be provided on a roll.

The present invention also relates to a software product comprising program code on a machine-readable medium, which program code, when loaded into a print controller of a digital printer according to the present invention, causes the print controller to execute the steps of the method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
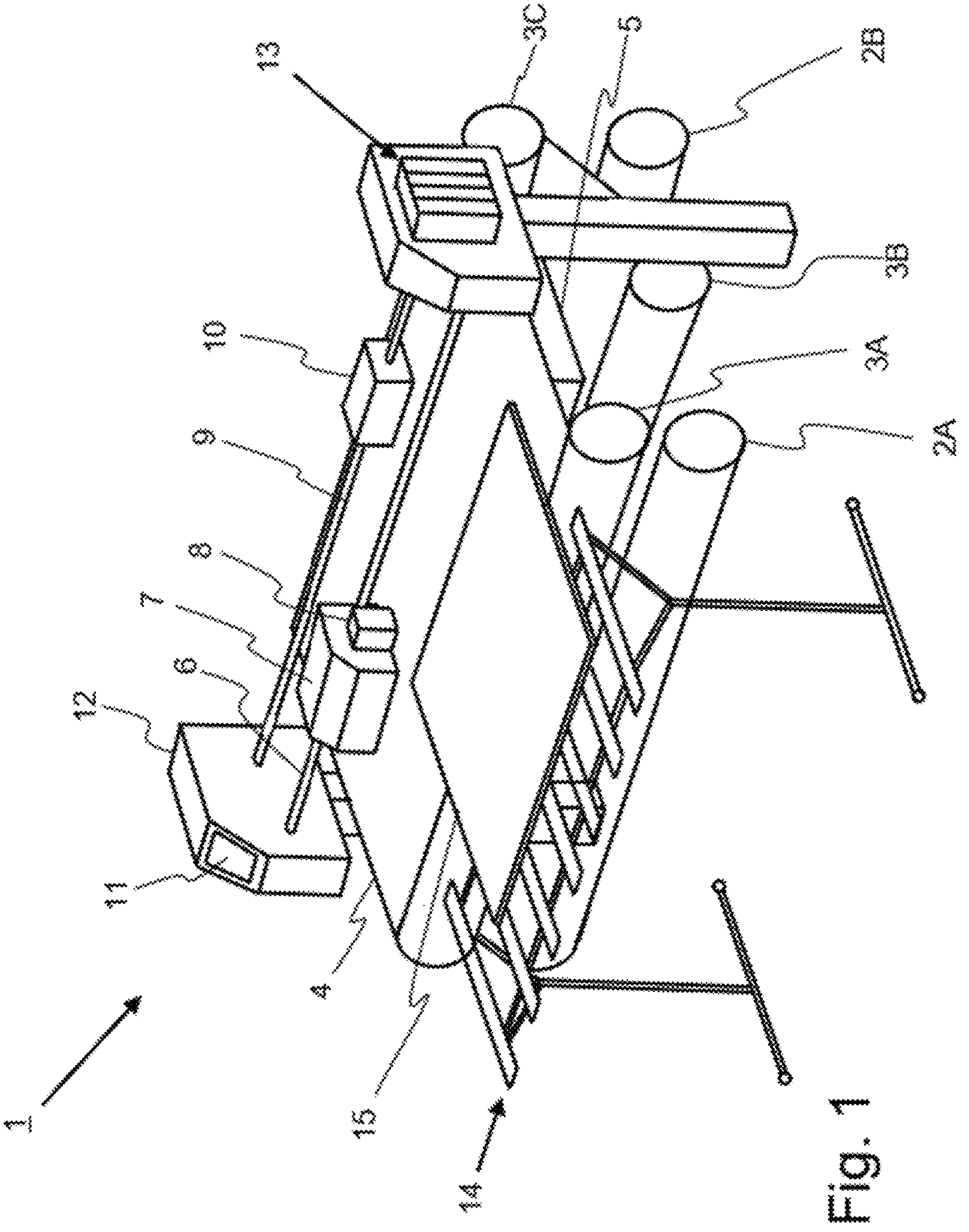
FIG. 1 is a schematic perspective view of a printing system configured to print on rigids according to the present invention.

The present invention will now be described with reference to the accompanying drawings, wherein the same reference numerals have been used to identify the same or similar elements throughout the several views.

Printing System

FIG. 1 shows a wide format inkjet printer 1. The wide-format printer 1 comprises an inkjet printing assembly 7 for printing on a print medium 15. The print medium 15 in FIG. 1 is a relatively rigid substrate, such as a panel. The print medium 15 is supplied from a media input unit 14, which may be configured for storing a plurality of such print media and supplying these to the printer 1. The printer 1 comprises transport means for receiving and transporting the print medium 15 along the inkjet printing assembly 7. In FIG. 1, the transport means comprise an endless transport belt 4 supported on a plurality of support rollers 3A, 3B, 3C. At least one of the support rollers 3A, 3B, 3C is provided with driving means for moving the belt 4. Additionally, one or more one of the support rollers 3A, 3B, 3C may be configured to be moved and/or tilted to adjust and control the lateral position of the belt 4. The printer 1 is provided with at least one sensor or detector, such as a CCD camera or area camera, to determine the relative position of belt 4 and/or the print medium 15. Data from said at least one sensor or detector may be applied to control the position of the belt 4 and/or the print medium 15. The at least one sensor or detector is positioned in or at a housing (not shown) of the printer 1 and is configured to detect the print medium 15 before transporting the print medium 15 or before the print medium reaches the print station 7. By using cameras the print medium can be detected over a full width of the medium support plane, and before the print station 7 will start printing on the print medium 15. The at least one sensor or detector can also sense or see alignment bars (not shown) positioned on the media input unit 14 extending towards the medium support plane. According to an alternative embodiment the at least one sensor or detector is integrated in the medium support plane.

The belt 4 is further provided with through-holes and a suction box 5 in connection with a suction source (not shown), such that an underpressure may be applied to the print medium 15 via the through-holes in the belt 4. The underpressure adheres the print medium 15 flatly to the belt 4 and prevents displacement of the print medium 15 with respect to the belt 4. Due to this holding the belt 4 is able to transport the print medium 15. It will be appreciated that other suitable transport means, such as rollers, steppers, etc., may alternatively be applied. The print medium 15 may be transported stepwise and/or in continuous movement.

The inkjet printing assembly 7 is configured to translate along a first guide beam 6 in a scanning direction. The scanning direction is perpendicular to the direction in which the print medium is transported by the belt 4. The inkjet printing assembly 7 holds a plurality of print heads (not shown), which are configured to jet a plurality of different marking materials (different colors of ink, primers, coatings, etc.) on the print medium 15. Each marking material for use in the printing assembly 7 is stored in one of a plurality of containers arranged in fluid connection with the respective print heads for supplying marking material to said print heads to print an image on the print medium 15.

The ejection of the marking material from the print heads is performed in accordance with data provided in the respective print job. The timing by which the droplets of marking material are released from the print heads determines their position on the print medium 15. The timing may be adjusted based on the position of the inkjet printing assembly 7 along the first guide beam 6. The above mentioned sensor 8 may therein be applied to determine the relative position and/or velocity of the inkjet printing assembly 7 with respect to the print medium 15. Based upon data from the sensor 8, the release timing of the marking material may be adjusted.

Upon ejection of the marking material, some marking material may be spilled and stay on a nozzle surface of the print heads. The marking material present on the nozzle surface, may negatively influence the ejection of droplets and the placement of these droplets on the print medium 15. Therefore, it may be advantageous to remove excess of marking material from the nozzle surface. The excess of marking material may be removed for example by wiping with a wiper and/or by application of a suitable anti-wetting property of the surface, e.g. provided by a coating.

The marking materials may require treatment to properly fixate them on the print medium. Thereto, a fixation unit 10 is provided downstream of the inkjet printing assembly 7. The fixation unit 10 may emit heat and/or radiation to facilitate the marking material fixation process. In the example of FIG. 1, the fixation unit 10 is a radiation emitter, which emits light of certain frequencies, which interacts with the marking materials, for example UV light in case of UV-curable inks. The fixation unit in FIG. 1 is translatable along a second guide beam 9. Other fixation units 10, such as page-wide curing or drying stations may also be applied. Further, the inkjet printing assembly 7 may be provided with a further fixation unit on the same carriage which holds the print heads. This further fixation unit can be used to (partially) cure and/or harden the marking materials, independent of or interaction with the fixation unit 10.

After printing, and optionally fixation, the print medium 15 is transported to a receiving unit (not shown). The receiving unit may comprise a take-up roller for winding up the print medium 15, a receiving tray for supporting sheets of print medium 15, or a rigid media handler, similar to the media input unit 14. Optionally, the receiving unit may comprise processing means for processing the medium 15 after printing, e.g. a post-treatment device such as a coater, a folder, a cutter, or a puncher.

The wide-format printer 1 furthermore comprises a user interface 11 for receiving print jobs and optionally for manipulating print jobs. The local user interface unit 11 is integrated to the print engine and may comprise a display unit and a control panel. Alternatively, the control panel may be integrated in the display unit, for example in the form of a touch-screen control panel. The local user interface unit 11 is connected to a control unit 12 connected to the printer 1. The control unit 12, for example a computer, comprises a processor adapted to issue commands to the printer 1, for example for controlling the print process. The printer 1 may optionally be connected to a network. The connection to the network can be via cable or wireless. The printer 1 may receive printing jobs via the network. Further, optionally, the control unit 12 of the printer 1 may be provided with an input port, such as a USB port, so printing jobs may be sent to the printer 1 via this input port.

Hybrid Printing System

Figure 2:
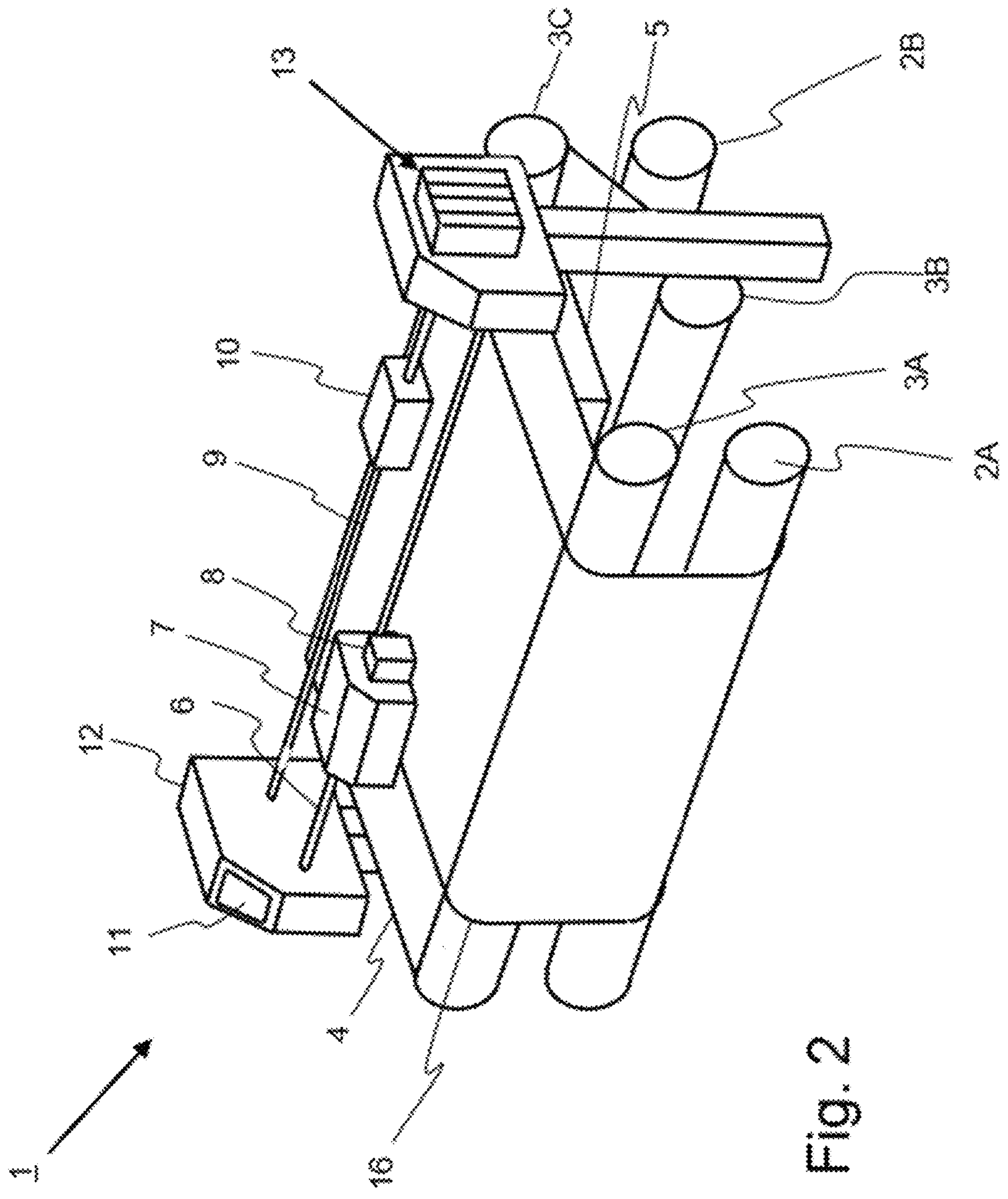
FIG. 2 is a schematic perspective view of a printing system in FIG. 1 configured to print on a roll of media according to the present invention.

The printer 1 in FIG. 1 is a so-called hybrid printer, capable of handling both flexible media and rigid substrates. In FIG. 1, the printer 1 operates in a first print situation, wherein the printer 1 is configured for transporting rigid substrates, such as the print medium 15. Such rigid print media 15 may be panels for doors, walls, etc., corrugated media, plates formed of plastic or metal, etc. To handle these rigid print media 15, the printer 1 in FIG. 1 is configured with a substantially linear transport path: from the media input device 14, the print medium 15 moves forward along the inkjet printing assembly 7 at a at substantially constant height. The media input unit 14 and the receiving unit are positioned at the level of the medium support surface of the belt 4. In FIG. 2, a flexible web medium 16 is supplied to the printer 1, which web medium 16 may be composed of e.g. paper, label stock, coated paper, plastic or textile. The web medium 16 is supplied from the input roller 2A and extends across the belt 4 to the take-up roller 2B, where the web medium 16 is re-wound. The printer 1 is configured to swiftly and efficiently switch between print modes.

Control

Figure 3:
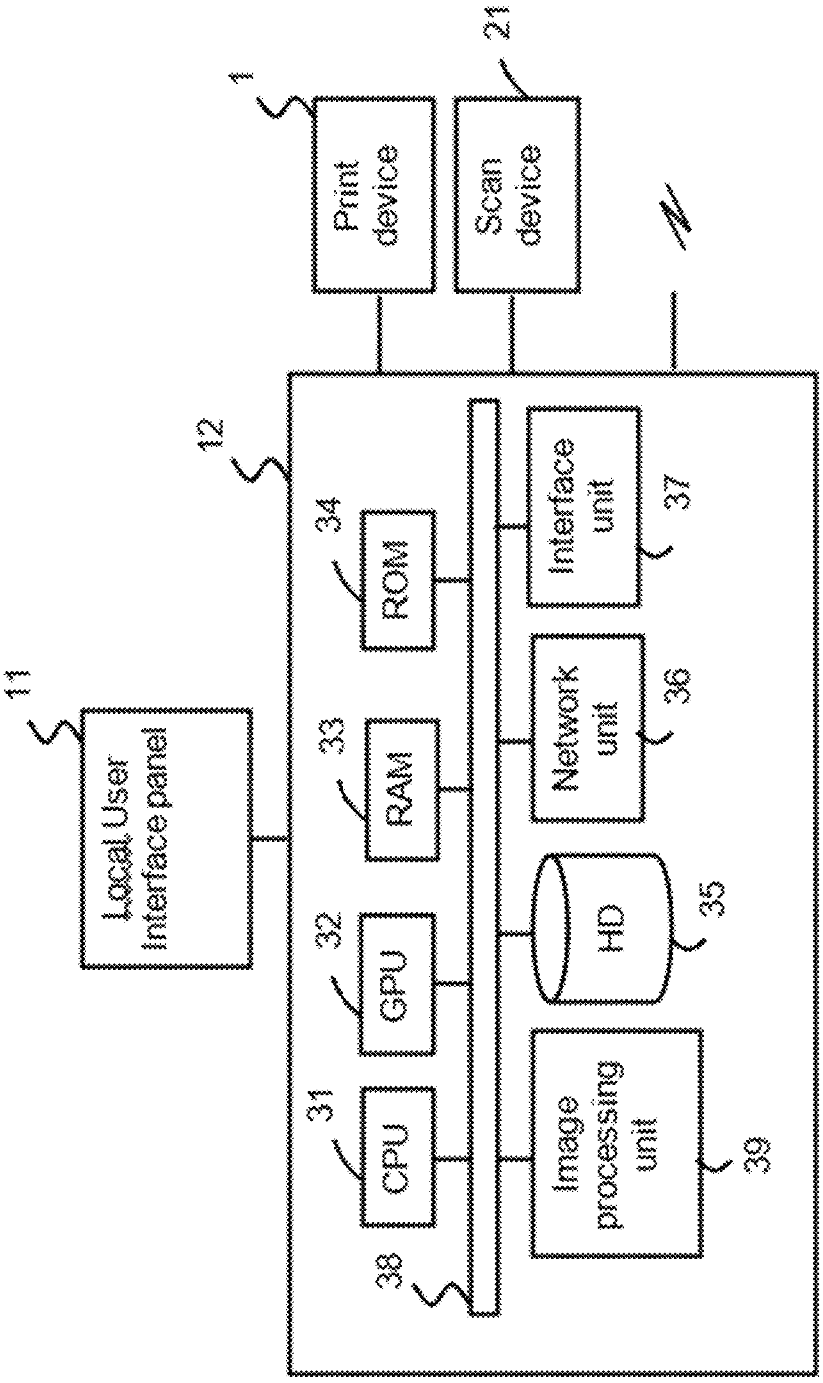
FIG. 3 is a schematic diagram of a control unit of a printer according to FIG. 1 or 2.

An embodiment of the control unit 12 is in more detail presented in FIG. 3. As shown in FIG. 3, the control unit 12 comprises a Central Processing Unit (CPU) 31, a Graphical Processor Unit (GPU) 32, a Random Access Memory (RAM) 33, a Read Only Memory (ROM) 34, a network unit 36, an interface unit 37, a hard disk (HD) 35 and an image processing unit 39 such as a Raster Image Processor (RIP). The aforementioned units 31-37 are interconnected through a bus system 38. However, the control unit 12 may also be a distributed control unit.

The CPU 31 controls the printing system 1 in accordance with control programs stored in the ROM 34 or on the HD 35 and the local user interface panel 11. The CPU 31 also controls the image processing unit 39 and the GPU 32. The ROM 34 stores programs and data such as boot program, set-up program, various set-up data or the like, which are to be read out and executed by the CPU 31. The hard disk 35 is an example of a non-volatile storage unit for storing and saving programs and data which make the CPU 31 execute a print process to be described later. The hard disk 35 also comprises an area for saving the data of externally submitted print jobs. The programs and data on the HD 35 are read out onto the RAM 33 by the CPU 31 as needed. The RAM 33 has an area for temporarily storing the programs and data read out from the ROM 34 and HD 35 by the CPU 31, and a work area which is used by the CPU 31 to execute various processes. The interface unit 37 connects the control unit 12 to the client device 21 and to the printing system 1. The network unit 36 connects the control unit 12 to the network N and is designed to provide communication with workstations and with other devices reachable via the network N. The image processing unit 39 may be implemented as a software component running on an operation system of the control unit 12 or as a firmware program, for example embodied in a field-programmable gate array (FPGA) or an application-specific integrated circuit (ASIC). The image processing unit 39 has functions for reading, interpreting and rasterizing the print job data. Said print job data contains image data to be printed (i.e. fonts and graphics that describe the content of the document to be printed, described in a Page Description Language or the like), image processing attributes and print settings.

Multi-Lanes Concept

Figure 4:
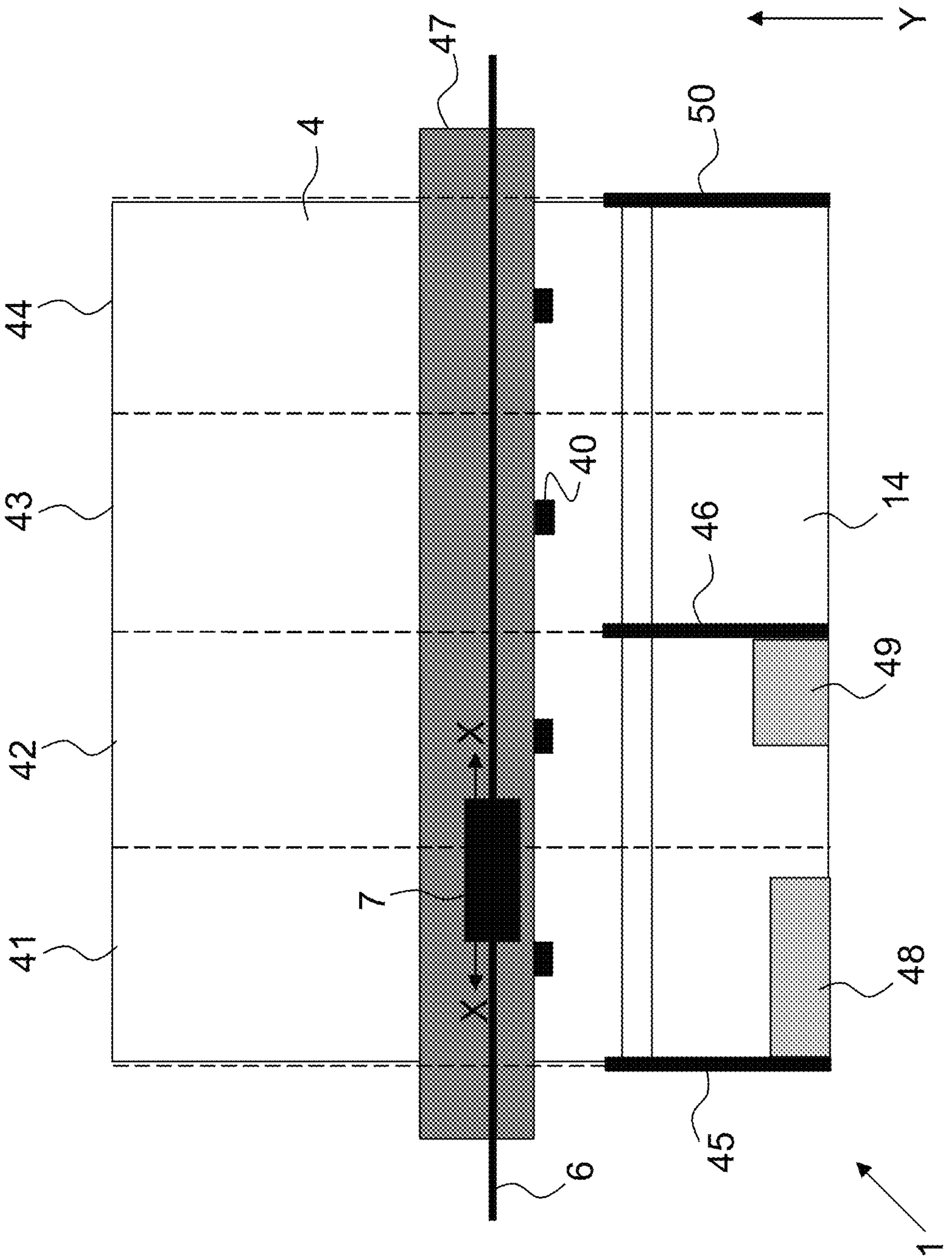
FIG. 4 is a schematic view of the media support plane of the printer according to FIG. 1.

FIG. 4 shows schematically the printer 1 seen from above provided with a multilane concept. The belt 4 is divided into lanes 41, 42, 43, 44 which are parallel in the transport direction Y of the print media on the media input unit 14 and the belt 4. In parallel a plurality of individual print media may be transported perpendicular to a scanning direction X of the print station 7 of the printer 1. The print media may have different dimensions. Positions of each individual print medium is determined. A designated image specific for each print medium is jetted on each respective print medium. The above steps are repeated such that print media are printed in parallel lanes 41, 42, 43, 44 perpendicular to the scanning direction.

In this example, four lanes 41, 42, 43, 44 are depicted. However, according to the invention the number of lanes may be in principle two or more lanes. A number of preferred configurations will be described in FIG. 5.

The position and the widths of the lanes 41, 42, 43, 44 on the belt 4 and the media input unit 14 are configurable via the user interface 11. Such a configuration is determined by the positions of one or more guiding bars 45, 46, 50.

The lanes 41, 42, 43, 44 are completely or partially bound by guiding bars 45, 46, 50 extending on the media input unit 14 towards the belt 4 in the transport direction Y of the belt 4.

The print media may be aligned by means of the guiding bars 45, 46, 50. A print media piece may be left aligned or right aligned. For example print media piece 48 is left aligned along guiding bar 45 and print media piece 49 is right aligned along guiding bar 46. The print media may have different sizes, i.e. different lengths and/or widths.

A housing 47 above the belt 4 comprises a guiding rail 6 via which the print station 7 is able to travel in the scanning direction X. The housing 47 also comprises one or more sensors (not shown) which are downward directed to the belt 4 for detecting a presence and a position of print media in the lanes 41-44. The housing 47 also comprises signaling objects 40 at the front side directed to the media input unit 14 for signaling if a lane is disabled or enabled. A signaling object 40 is positioned above each of the defined lanes 41-44.

The signaling object 40 preferably is a LED lamp. The signaling object 40 may be deactivated when the lane is disabled or when in use but no media may be fed at the moment. The signaling object 40 may be activated when the lane is enabled. However, other ways of signaling in order to indicate that a lane is disabled or enabled may be envisioned within the scope of the present invention. The signaling object may have a green light when a print medium can be fed. Other colors can be used, e.g. a red color for an error at printing, or a color green blinking when a print medium can soon be fed.

If a particular lane is disabled, no marking material will be jetted downwards from the print station 7 when the print station is travelling over the particular lane in the scanning direction X.

Figure 5A:
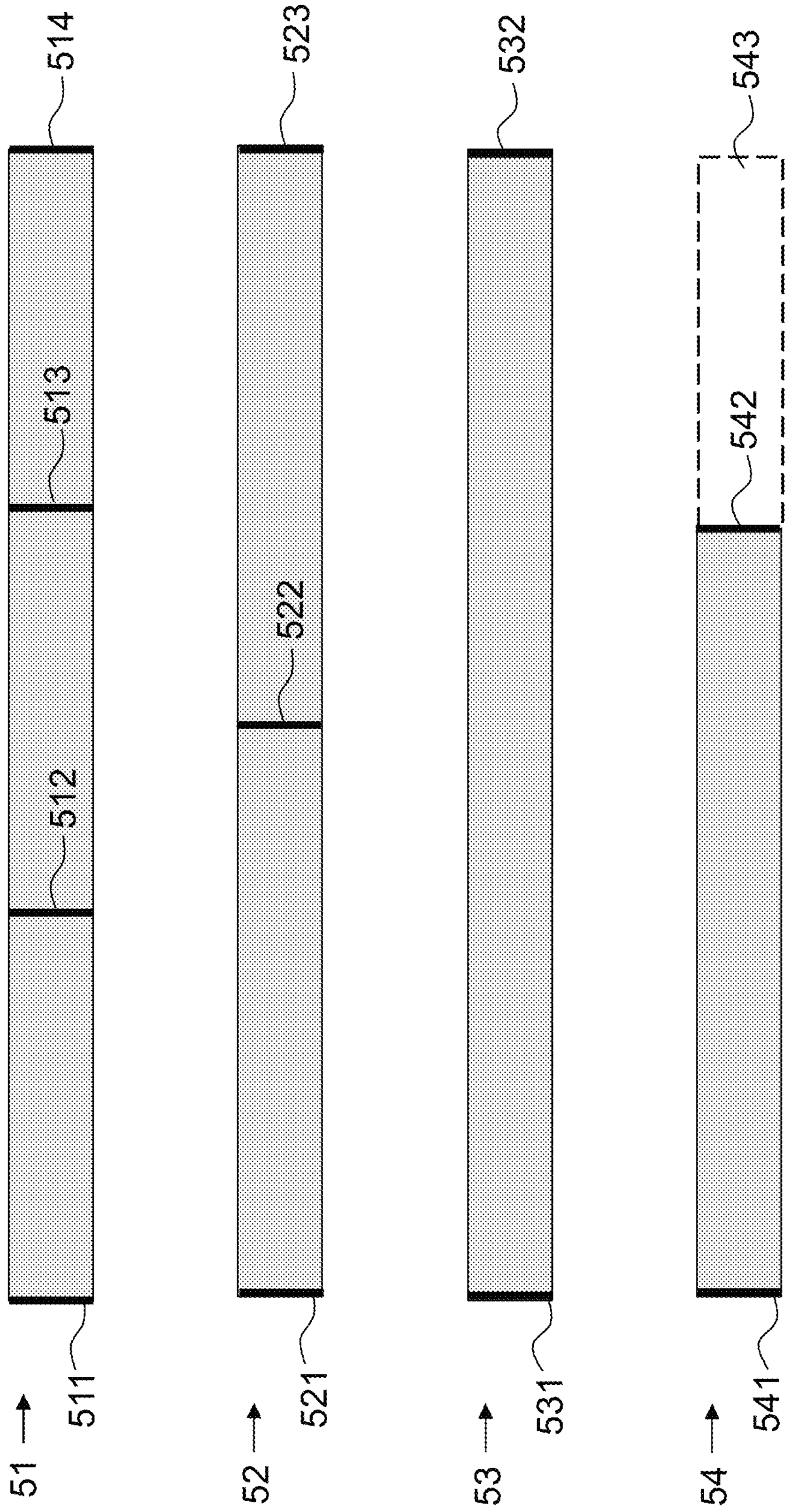
FIG. 5A is a schematic diagram of alignment positions for print media on the media support plane.

FIG. 5A schematically shows examples of table layouts of the media support plane 4 provided with guiding bars according to the present invention.

A first table layout 51 comprises 4 alignment bars, i.e. one alignment bar 511 at a left side of the table, one alignment bar 512 at one third of the table, one alignment bar 513 at two third of the table and one alignment bar 514 at a right side of the table. The first table layout 51 results in at most 6 lanes.

A second table layout 52 comprises 3 alignment bars, i.e. one alignment bar 521 at a left side of the table, one alignment bar 522 halfway of the table and one alignment bar 523 at a right side of the table. The second table layout 52 results in at most 4 lanes. A third table layout 53 comprises 2 alignment bars, i.e. one alignment bar 531 at a left side of the table and one alignment bar 532 at a right side of the table. The third table layout results in at most 2 lanes.

A fourth table layout 54 also comprises 2 alignment bars, i.e. one alignment bar 541 at a left side of the table and one alignment bar 542 at two third of the table, wherein the remaining one third 543 of the table is not used. The fourth table layout 54 results in at most 2 lanes. By positioning the alignment bar at a position of ⅔$^{rd}$ of the medium support plane only a part of the medium support plane at the left side of the alignment bar is used. This will already result in a higher productivity which can even be increased by disabling the right aligned lane, for example if two rigid boards do not fit next to each other.

Figure 5B:
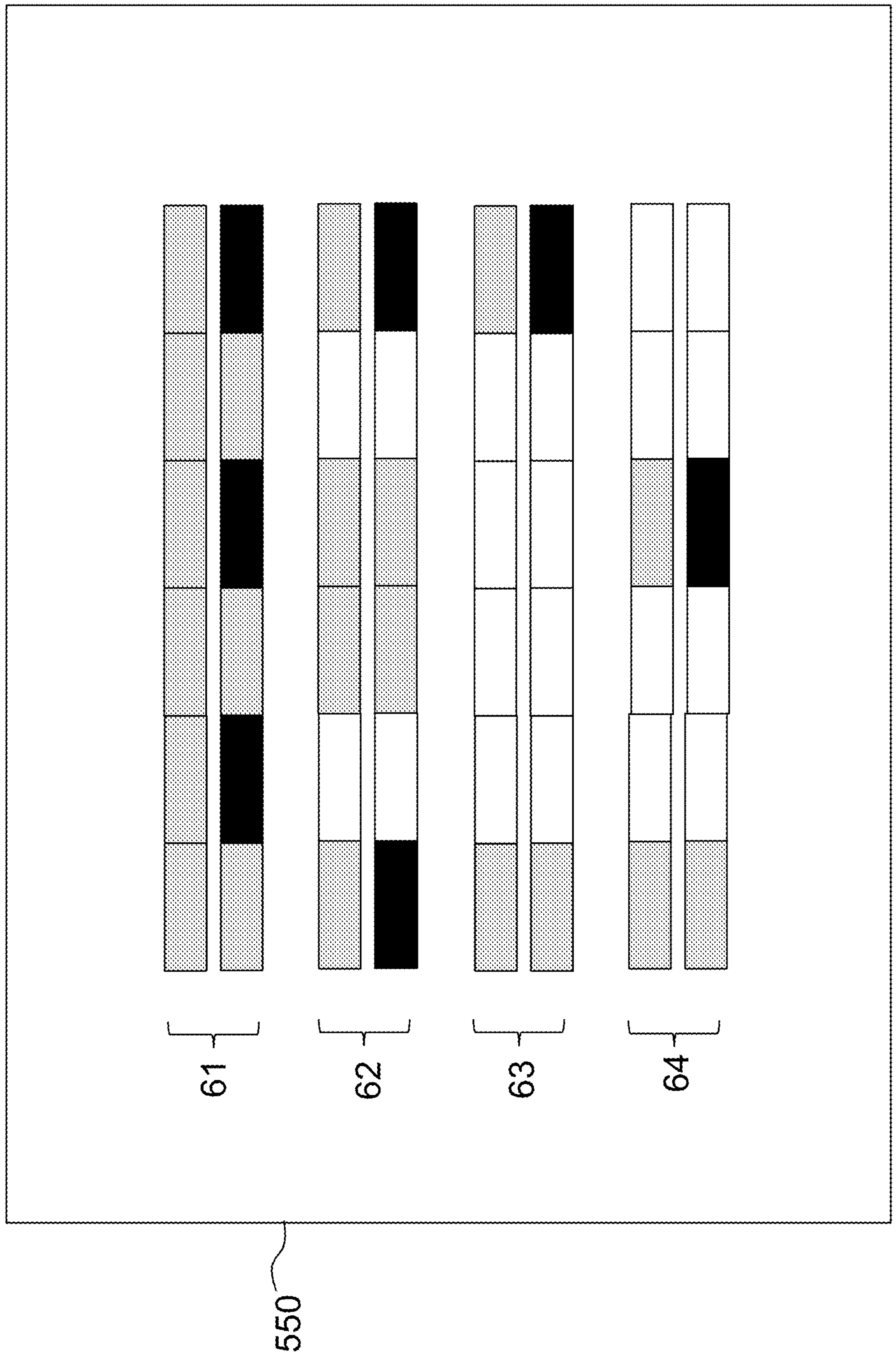
FIG. 5B is a user interface for enabling and disabling lanes according to the present invention.

FIG. 5B shows an example of a user interface screen 550 to be displayed on the user interface 11. The user interface screen 550 enables the operator to disable or enable lanes by disabling or enabling at least one alignment position in a row 61-64 of alignment positions according to each one of the table layouts 51-54 shown in FIG. 5A respectively.

Each guiding bar shown in the table layouts 51-54 of FIG. 5A facilitates zero, one or two alignment positions in the rows 61-64 of alignment positions in FIG. 5B, i.e. no position for alignment of the print media, a position for a left alignment of the print media and/or a position for a right alignment of the print media.

An allowed alignment position is colored green at the user interface screen (in FIG. 5B grey) if it is enabled. An allowed alignment position is colored red at the user interface screen (in FIG. 5B black) if it is disabled. The non-colored alignment positions in the rows of alignment positions in FIG. 5B refer to non-existing alignment positions according to the corresponding table layouts 51-54 in FIG. 5A and are not allowed.

The rows 61 correspond to a multilane concept of 6 lanes, the rows 62 correspond to a multilane concept of 4 lanes, the rows 63-64 correspond to multilane concept of 2 lanes. The rows 61-64 give examples of possible disabling and enabling of alignment positions. Other examples may be envisioned by changing a number of lanes, a number of alignment bars, a number of allowed alignment positions, a number of disabled lanes, etc. Actually the number of rows of enabled and/or disabled alignment positions equals 2 ^(the total number of alignment positions)−1, where the symbol "^" represents the mathematical power function and the possibility of all lanes being disabled is excluded. According to a preferred embodiment the user interface screen 550 is configured to allow a toggle of each allowed alignment position from an enabled state to a disabled state and vice versa.

By disabling a lane respectively alignment position the printer 1 can become more productive which depends on the size of the rigid. For example, when one guiding bar is positioned in the middle of the medium support plane, the operator can use four lanes. If the operator is feeding boards with a size of about ⅓ of the maximum width and of two images to be printed one may be left aligned and one may be right aligned. Then the operator can use the bars at the outsides of the medium support plane or he can use both sides of the bar in the middle. The last case will be more productive, when the printer knows not to use the alignment bar at the right side. In a case wherein the medium support plane has only the bars at the outsides of the medium support plane and an operator is feeding midsize boards and the operator wants to feed all boards on the left, the operator can disable the right lane. This will increase the productivity since the print station will only move on the left lane or rigid width, so reducing a travel distance of the carriage for each swath.

By defining a table layout and corresponding enabled and disabled lanes c.q. alignment positions, the print station 7 does not have to travel a full width distance of the table of the printer 1 by taking into account a known width of the lanes or even a known width of the rigids in order to reduce the travel distance.

Figure 5C:
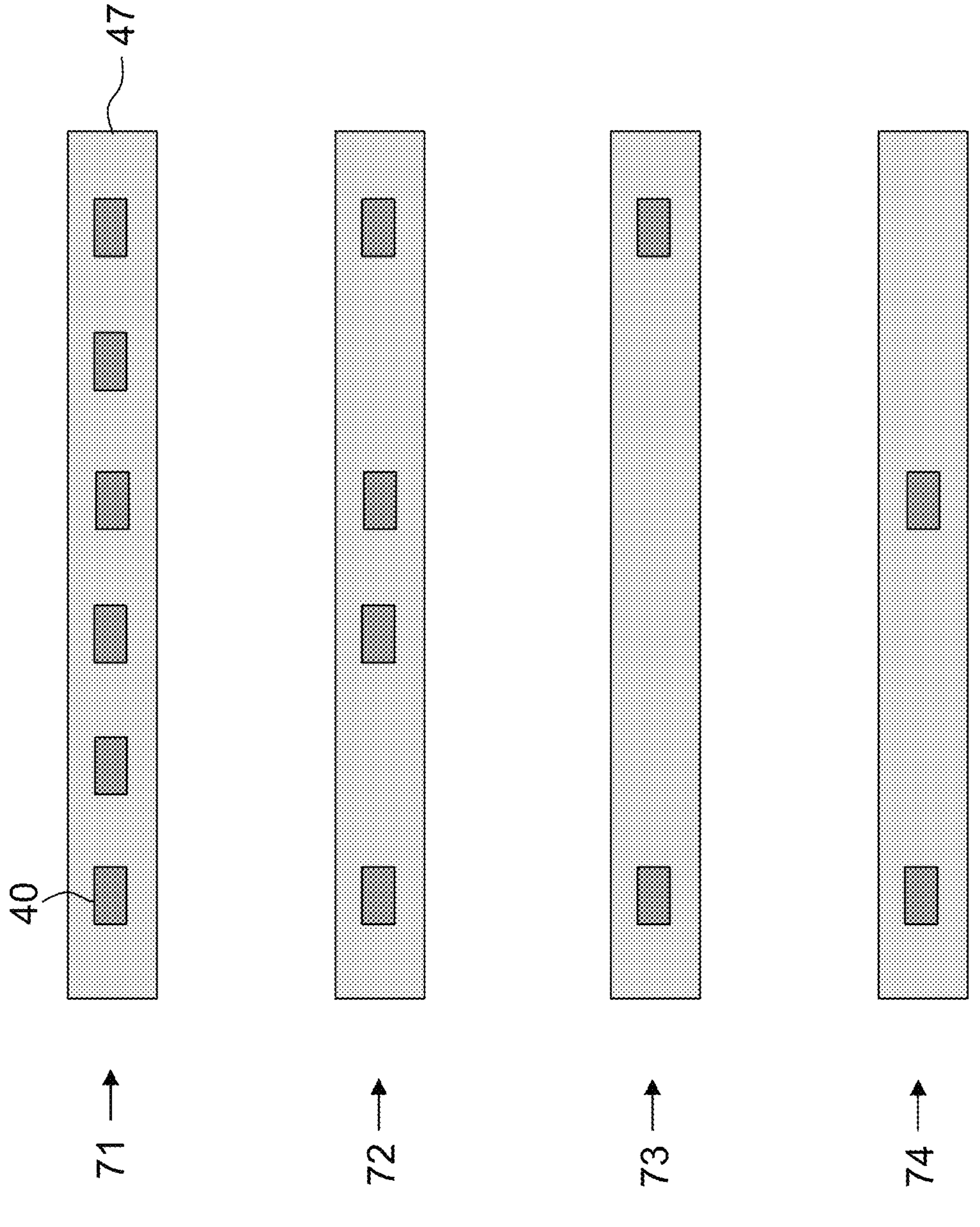
FIG. 5C is a schematic diagram of signaling layouts of the signaling objects according to the present invention.

FIG. 5C schematically shows a front side of the housing 47 comprising the signaling objects 40. FIG. 5C shows examples of signaling layouts 71-74 of the signaling objects 40 above the media support plane 4 according to the present invention.

The signaling layouts 71-74 correspond to the table layouts 51-54 in FIG. 5A respectively, wherein each lane is enabled and not blocked.

The planning of feeding of a print medium in the printer may be directly derived from the print job order sequence in the print queue of the printer 1, where each print job indicates sizes of the at least one image to be printed on the print medium 48A. The print controller 12 keeps track of the completed images, the currently being printed images and the images to be scheduled for printing. A next print job to be printed may have a deviating setting which influences the printing and also the feeding of print medium upon which the next print job is going to be printed. Beforehand the print controller can control the signaling objects 40 to indicate which lanes are free for feeding print media by the operator for the next print job, i.e. the lanes that are not blocked. Before feeding the print media into the medium support plane, the operator has to define and acknowledge by means of a system setting of the printer 1 the size of the print media to be fed at the start of a print job. Thus the printer 1 knows the size, e.g. the width and the length of the print medium used for printing the images of the print job.

There are multiple reasons where lanes can interfere with each other and as such impact printing possibilities. The print controller 12 supports and controls these multiple reasons and indicates via the signaling objects 40 whether printing is a specific lane is possible or not. For example, a green light indicates that a next board can be fed, an off light indicates to not feed a board.

Figure 6:
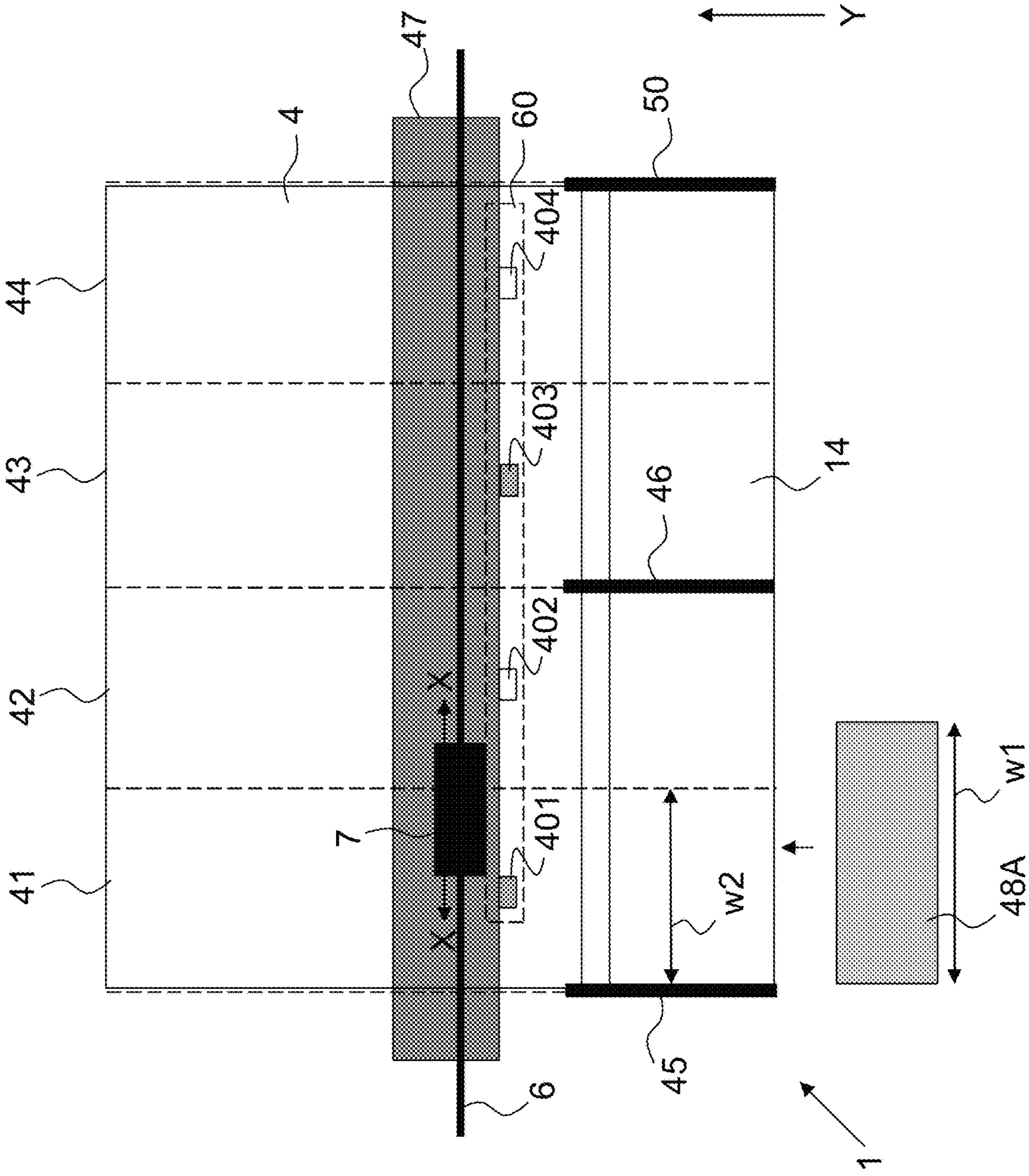
FIG. 6 shows a situation of blocking a lane according to the present invention.

FIG. 6 shows an example of a first reason as mentioned here-above. The printer 1 comprises alignment bars 45, 46, 50 extending in the transport direction Y and positioned at a side of at least one lane 41-44. The situation is that a next print job in the queue comprises an image which has a large size and is intended to be printed on a large print medium such as print medium 48A. The print medium 48A is next planned to be fed in a lane and has a width w1 which is wider in the scanning direction X than a half width w2 between two adjacent alignment bars 45, 46 which enclose the first lane 41 and the second lane 42. Therefore the second lane 42 should be blocked from feeding print media. The signaling layout 60 shows an example for a situation due to the first raison. A first signaling object 401 in the first lane 41 and a third signaling object 403 in the third lane 43 are green, i.e. the lanes 41 and 43 are not blocked and may be used to feed the print medium 48A on the medium support plane 4 via the media input unit 14. A second signaling object 402 in the second lane 42 and a fourth signaling object 404 are off, i.e. the lanes 42 and 44 are blocked and may not be used to feed the print medium 48A.

In an embodiment of the present invention the method comprises the step of, while printing on the print media 48A, reducing a pass width of the print station 7 in the scanning direction X to be equal to a width w1 of the print medium 48A into account. This is advantageous since it will lead to a higher productivity of the printer 1.

A second reason for blocking a lane relates to print modes of the print jobs. The printer 1 may be configured to print in different print modes. A print mode is a way of printing the swaths on the image receiving medium. A first print mode may have for example a different number of passes to complete a swath than a second print mode. Therefore a print medium to be printed upon according the second print mode in a first lane 41 for example cannot be printed in parallel with another print medium to be printed upon according to the first print mode in one of the other lanes 42, 43, 44. In a situation when printing at least one image of a print job in the first print mode and detecting a next print job comprising an image to be printed in the second print mode, all lanes should be blocked to avoid feeding print media until the printer has completed the printing of the at least one image of the print job in the first print mode. In a situation due to the second reason all signaling objects 401-404 should be off.

A third reason for blocking a lane relates to thicknesses of print media. The printer 1 may be configured to print on print media having different thicknesses. For each thickness the print station 7 should be moved in a height direction perpendicular to the medium support plane to lower or raise up the print station 7 in order to get a correct distance that the marking material has to spit from the print station 7 on the print medium of a certain thickness and to avoid a collision between the print station 7 and the print medium. During a pass of the print station in the scanning direction X the print station cannot be moved in the height direction. A first print medium may have for example a different thickness than a second print medium. Therefore the first print medium in a first lane 41 cannot be printed in parallel with the second print medium to be printed upon in one of the other lanes 42, 43, 44. In a situation when printing at least one image of a print job on a print medium of a first thickness and detecting a next print job comprising an image to be printed on a print medium of a second thickness other than the first thickness, all lanes should be blocked for feeding print media until the printer has completed the printing of the at least one image of the print job on the print media of the first thickness. In a situation due to the third reason all signaling objects 401-404 should be off.

A fourth reason for blocking a lane relates to new print media, i.e. a print media which is unknown to the printer 1. The printer 1 may be configured to print on print media which are known from a media catalogue stored in the print controller 12. For each stored print media the media catalogue provides print media settings in order to let the printer function well when printing on the print media, for example to have an excellent print quality. Before printing on a new print media is allowed, the media catalogue should be updated by entering the new print media with all its appropriate print media settings I the media catalogue.

Therefore the first new print medium in a first lane 41 cannot be printed in parallel with the second known print medium to be printed upon in one of the other lanes 42, 43, 44. In a situation when detecting a print job to be printed on a new print media having unknown media settings like type or size, all lanes should be blocked for feeding the new print media until the new print media is made known to the printer, i.e. is entered in a media catalogue of the printer 1 and the printer 1 has completed the printing of the pending images of previous print jobs. In a situation due to the fourth reason all signaling objects 401-404 should be off.

A fifth reason for blocking a lane relates to vacuum zone requirements, i.e. requirements with respect to the suction box 5 in connection with a suction source (not shown in FIG. 1) provided at the belt 4 which is further provided with through-holes to the suction box 5, such that an underpressure may be applied to the print medium 15 via the through-holes in the belt 4. The underpressure adheres the print medium 15 flatly to the belt 4 and prevents displacement of the print medium 15 with respect to the belt 4. Due to this holding the belt 4 is able to transport the print medium 15. At least 90% of a rigid must be covered by the vacuum to create proper transport of the rigid. The print system 1 may have for example 6 input vacuum zones, divided over the width of the medium support plane and aligned with the maximal 6 printing lanes.

In a 4 lane configuration, there are 3 vacuum zones between 2 alignment bars. The middle vacuum zones must be either enabled or disabled to allow proper feeding of the left aligned rigid. For example if the width of the rigid is more than halfway to the right alignment bar, the middle vacuum zone must be enabled. When the middle zone is enabled for the left aligned rigid, it is not possible to also feed a right aligned rigid, as then 2 rigids would be handled by the same middle vacuum zone at the same time. In that case proper transport is not guaranteed. Therefore the second lane from the left side of the medium support plane will be blocked. In a situation due to the fifth reason the second signaling object from the right side of the medium support plane should be off.

When applying the present invention the operator is fully guided with the activated signaling objects above the printing lanes whether or not it is allowed to feed a next board. The operator does not need to know any details of the engine of the printer 1.

Figure 7A:
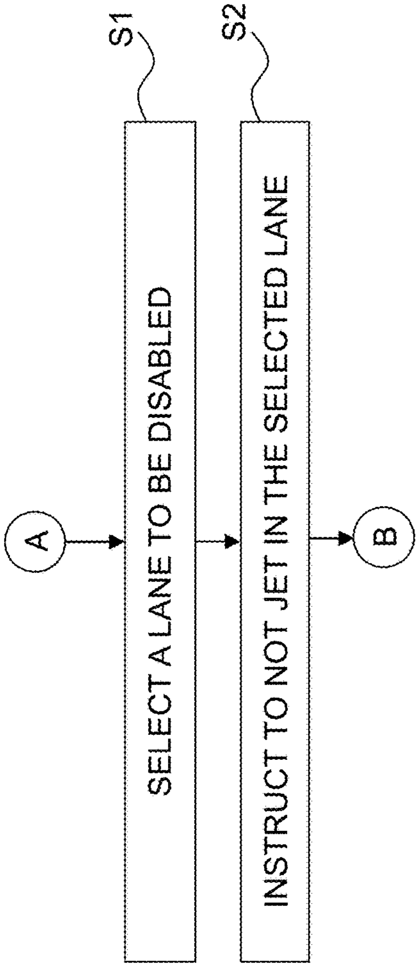
FIG. 7A is a schematic block diagram illustrating the steps of a first method according to the present invention.

FIG. 7A discloses an example of a first method according to the invention.

The first method starts in a starting point A which leads to a first step S1.

In the first step S1 at least one individual lane is selected via the user interface 11 of the printer 1 in order to be disabled. The user interface 11 is connected to the print controller 12 of the printer 1.

In a second step S2 the print controller 12 instructs the print station 7 to not jet marking material on the at least one selected lane.

The first method ends in an end point B.

Figure 7B:
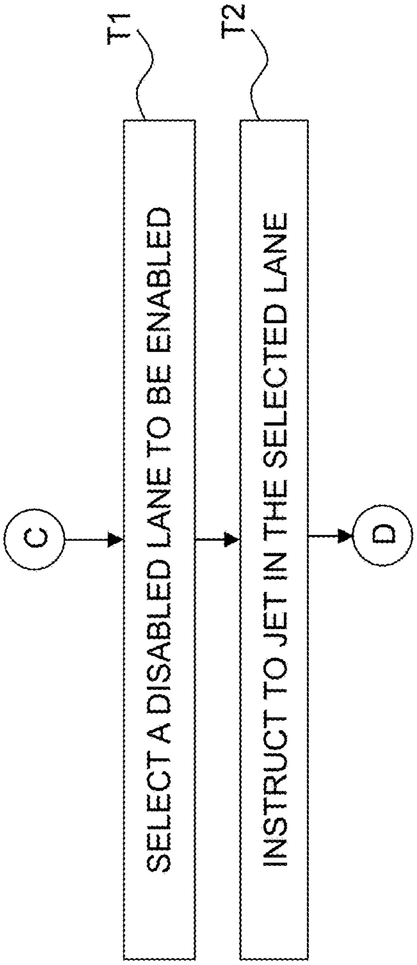
FIG. 7B is a schematic block diagram illustrating the steps of a second method according to the present invention.

FIG. 7B discloses an example of a second method according to the invention.

The second method starts in a starting point C which leads to a first step T1.

In the first step T1 at least one individual disabled lane is selected via the user interface 11 of the printer 1 in order to be enabled. The user interface 11 is connected to the print controller 12 of the printer 1.

In a second step T2 the print controller 12 instructs the print station 7 to jet marking material on the at least one selected lane in order to achieve the at least one image of a print job.

The second method ends in an end point D.

Figure 8:
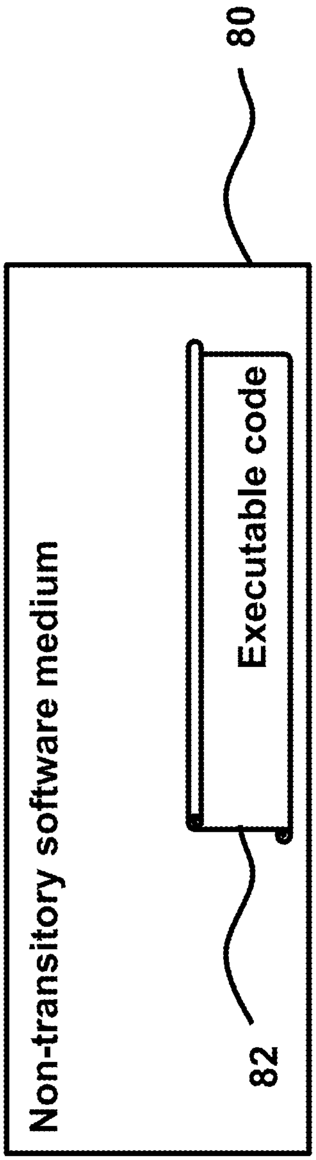
FIG. 8. is a diagram of a software product according to the present invention.

FIG. 8 schematically shows a non-transitory software medium 80 according to the invention. The software medium 80 comprises executable code 82 configured to, when executed, perform the method according to the invention, e.g. as described with respect to either the printing system 1 shown in FIG. 1 or the method of controlling the printing system 1 according to the present invention and/or according to any of the variants and modifications of the printing system 1 and/or of the method described herein.

The non-transitory software medium 80 may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms “comprise”, “comprising”, “include”, “including”, “contain”, “containing”, “have”, “having”, and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms “a” and “an” used herein are intended to be understood as meaning one or more unless explicitly stated otherwise. Moreover, the terms “first”, “second”, “third”, etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for a printer, the printer comprising a transport device comprising an endless transport belt supported on a pair of support rollers, a medium support plane being defined between the pair of support rollers, and a print station being provided over the medium support plane, wherein the method comprises the steps of:

transporting in parallel a plurality of individual print media perpendicular to a scanning direction of the print station on the medium support plane, the print media having different dimensions;

determining positions of the individual print media;

based on the determined positions of the individual media, jetting marking material for forming a designated image specific for each print medium on each respective print medium, wherein the above steps are repeated such that print media are printed in a plurality of parallel lanes on the medium support plane perpendicular to the scanning direction, wherein the method comprises the step of enabling or disabling each individual lane of the plurality of parallel lanes in order to respectively facilitate or prohibit jetting of the marking material at the individual lane; and wherein the method comprises the step of disabling at least one lane from one of the sides of the medium support plane parallel to the transport direction of the print media and, while printing on the print media, reducing a swath of the print station in the scanning direction so that the at least one disabled lane is not scanned by the print station.

2. The method according to claim 1, wherein the printer comprises above each lane a signaling object, the step of enabling at least one lane comprises the sub-step of activating the signaling object above the at least one lane, and the step of disabling at least one lane comprises the sub-step of deactivating the signaling object above the at least one lane.

3. The method according to claim 2, wherein the signaling object is a LED light indication.

4. The method according to claim 1, wherein the printer comprises alignment bars extending in the transport direction and positioned at a side of at least one lane, and the method further comprises the steps of:

detecting a print medium being fed in a first lane, the print medium being wider in the scanning direction than half a width between two adjacent alignment bars enclosing the first lane and a second lane; and blocking the second lane for feeding print media.

5. The method according to claim 1, wherein the method further comprises the steps of:

printing the at least one image of a print job in a first print mode;

detecting a next print job comprising an image to be printed in a second print mode; and blocking all lanes for feeding print media until the printer has completed the printing of the at least one image of the print job in the first print mode.

6. The method according to claim 1, wherein the method further comprises the steps of:

printing the at least one image of a print job on a print media of a first thickness, detecting a next print job comprising an image to be printed on a print media of another thickness than the first thickness, and blocking all lanes for feeding print media until the printer has completed the printing of the at least one image of the print job on the print media of the first thickness.

7. The method according to claim 1, wherein the method further comprises the steps of:

detecting a print job to be printed on a new print media having unknown media settings, including type or size; and blocking all lanes for feeding the new print media until the new print media is made known to the printer and the printer has completed the printing of the pending images of previous print jobs.

8. The method according to claim 1, wherein the step of enabling or disabling each individual lane of the plurality of parallel lanes comprises the sub-step of receiving an indication for each lane that should be enabled or disabled by means of a user interface of the printer.

9. A printer comprising:

a transport device comprising an endless transport belt supported on a pair of support rollers, a medium support plane being defined between the pair of support rollers, a print station being provided over the medium support plane; and a print controller configured to execute the steps of the method according to claim 1.

10. The printer according to claim 9, wherein the printer comprises above each lane a signaling object which is activated when the corresponding lane is enabled and which is deactivated when the corresponding lane is disabled.

11. The printer according to claim 9, wherein the printer comprises alignment bars extending in the transport direction and positioned at a side of at least one lane.

12. The printer according to claim 9, wherein the printer comprises at least one detector to detect a feeding of a print medium in the print medium plane.

13. The printer according to claim 9, wherein the printer is a hybrid printer for printing on rigid print media as well as on flexible print media.

14. A software product comprising program code on a non-transitory machine-readable medium, the program code, when loaded into a print controller of a digital printer, causing the print controller to execute the steps of the method according to claim 1.

* * * * *